United States Patent [19]

Aasted

[11] Patent Number: 5,850,782
[45] Date of Patent: Dec. 22, 1998

[54] APPARATUS FOR CONTINUOUS TEMPERING OF FAT-CONTAINING, CHOCOLATE MASSES

[75] Inventor: Lars Aasted, Charlottenlund, Denmark

[73] Assignee: Aasted Mikroverk ApS, Farum, Denmark

[21] Appl. No.: 853,375

[22] Filed: May 8, 1997

[30] Foreign Application Priority Data

May 9, 1996 [DK] Denmark .................................. 0558/96

[51] Int. Cl.[6] .............................. A23C 3/04; A23G 1/18; B23Q 15/00; F25C 1/14
[52] U.S. Cl. ..................... 99/455; 99/348; 99/470; 99/483; 366/144
[58] Field of Search .................. 99/348, 452–455, 99/458, 459, 460, 464, 466, 470, 483, 486; 366/144–147; 425/292, 262; 426/138, 231, 519, 524, 660; 165/94, 95; 62/353, 354, 342, 381, 343

[56] References Cited

U.S. PATENT DOCUMENTS

| | | |
|---|---|---|
| 4,859,483 | 8/1989 | Sollich . |
| 4,892,033 | 1/1990 | Sollich . |
| 4,998,464 | 3/1991 | Kubacki ................................. 99/455 |
| 5,514,390 | 5/1996 | Aasted ................................. 426/231 |
| 5,525,364 | 6/1996 | Haslund ............................. 99/348 X |
| 5,635,230 | 6/1997 | Aasted ............................. 425/262 X |
| 5,705,217 | 1/1998 | Aasted ............................. 425/292 X |

FOREIGN PATENT DOCUMENTS

| | | |
|---|---|---|
| 0 289 849 | 11/1988 | European Pat. Off. . |
| WO 92/00015 | 1/1992 | WIPO . |

*Primary Examiner*—Timothy F. Simone
*Attorney, Agent, or Firm*—Finnegan, Henderson, Farabow, Garrett & Dunner, L.L.P.

[57] ABSTRACT

An apparatus having a cylindrical tempering column comprising a cooling stage and a subsequent reheating stage for continuous tempering of a fat-containing, chocolate-like mass. A plurality of interconnected mass chambers are separated by intermediary heat exchange chambers. The mass chambers comprise mixing and stirring elements (8) with radially extending, plate shaped arms (11) comprising plate shaped mixing blades (13, 14, 15, 16; 17, 18, 19, 20). An upper or lower mixing blade (16; 20) arranged at the peripheral end of the mixing and stirring element (8) has a vertically extending end surface (27), thereby providing a shear gap between the end surface (27) and the cylinder wall (28). Thus the effect of a shear is provided at the comparatively large surface area at the cylinder wall and a considerable increase of the total area of the shear gaps is obtained. Furthermore, the total surface area of the plate shaped arms (11) and of the mixing blades (13, 14, 15, 16; 17, 18, 19, 20) may decrease gradually in direction out towards the peripheral cylinder wall. Hereby is achieved a considerable more uniform stirring of the mass at all areas of the chamber followed by an enhanced heat transport in the mass.

17 Claims, 2 Drawing Sheets

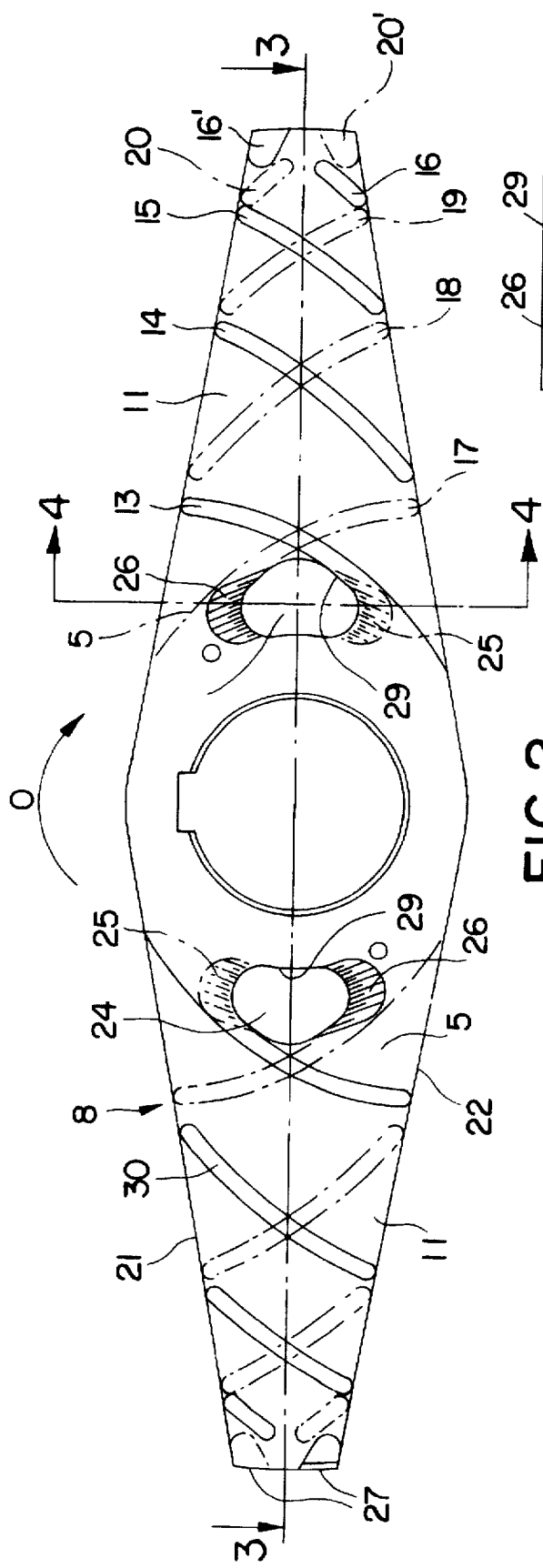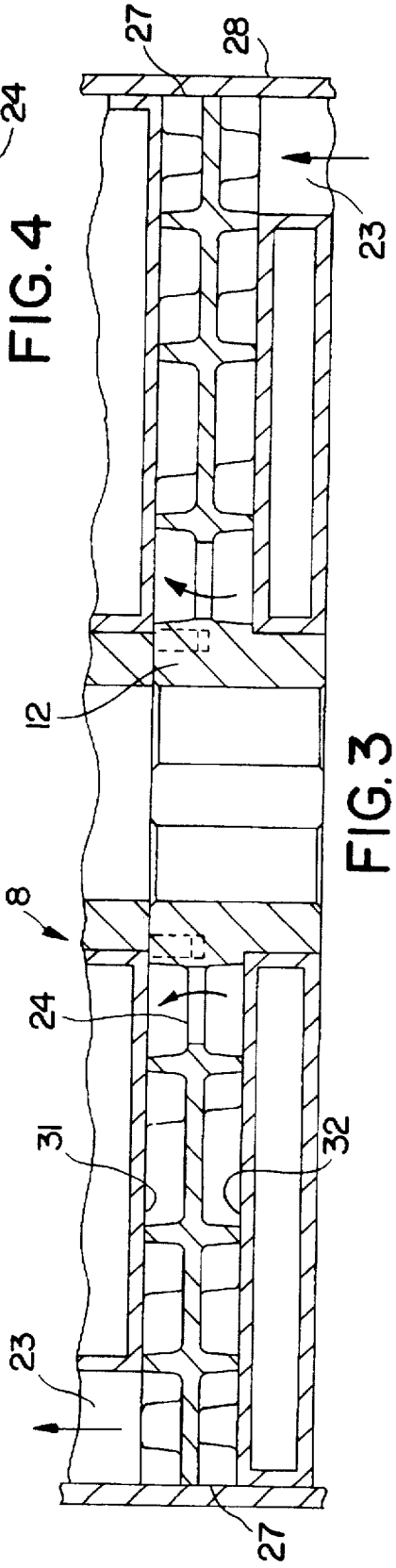

//5,850,782

APPARATUS FOR CONTINUOUS TEMPERING OF FAT-CONTAINING, CHOCOLATE MASSES

BACKGROUND OF THE INVENTION

The invention concerns the field of apparatuses having a cylindrical tempering column comprising a cooling stage and a subsequent reheating stage for continuous tempering of a fat-containing, chocolate-like mass pumped therethrough, which tempering column further comprises a plurality of interconnected mass chambers, which are separated by intermediary heat exchange chambers adapted to absorb heat from the mass chambers or to submit heat to the mass chambers during flow of cooling media through the cooling stage or flow of heating media through the reheating stage, respectively. The mass chambers further comprise mixing and stirring elements, which are rotated by the action of a common, central drive shaft arranged in the column. The mixing and stirring elements further comprise at least one radially extending, plate shaped arm comprising upper and lower, essentially vertically extending, plate shaped mixing blades, and which upper mixing blades extend radially opposite to the extension of the lower mixing blades, seen in the direction of rotation of the mixing and stirring elements or in the opposite direction, respectively.

The persons skilled within the above mentioned field of apparatuses for tempering have since long been observant to the fact, that the most optimal heat exchange between the mass and the heat exchange chambers during the flow of the mass through the column, is obtained when a good and uniform stirring of the mass is achieved in all parts of a mass chamber.

Though, for several decades it has been known to provide the plate shaped arms of the mixing and stirring elements with mixing blades, which extends along the radial leading or trailing edge of the plate shaped arm for the provision of forceful, radial flow of the chocolate mass in towards the centre of the mass chamber, and half a turn later again flow out towards the peripheral cylinder wall of the chamber—mass movements, which continuously shift between an ingoing and an outgoing radial flow.

By other embodiments of the mixing and stirring elements, the mixing blades are substituted by upwards extending or downwards extending knobs, respectively. One were here given attention to the creation of an especially expedient stirring having areawise whirling of the mass flow, so that the following heat exchange effect provided for a slight rise of approximately 0.5°–1.0° C. of the mass temperature at the exit of the column, whereby the mass became thinner at its flow.

EP-0 289 849 B1 describes an apparatus for tempering of the above mentioned art, each stirring element of which comprises as many as four plate shaped arms positioned at 90° angles to each other at a hub, which rotates with the drive shaft. The four arms provides together with the hub and the mixing parts frictional surfaces in contact with the mass of such an extension, that practical testing has shown, that the mass to a far higher extent is being dragged to rotation In the chamber instead of being stirred and mixed by the mixing elements, with the opposite effect of what was intended and a poor heat exchange as the result. This unintended tendency is furthermore supported by the resistance given by the inclined position of the mixing blades relative to their direction of movement during stirring.

The extensive frictional surfaces of the mixing and stirring elements according to the disclosure of the EP-patent further supports the creation of a considerably non-stirred, inner ringshaped mass area extending around the drive shaft. This inner non-stirred area simply follows the shaft during its rotation and is basically created due to the inclined position and uninterrupted extension of the radially inner mixing blades at the hub. Extensive frictional surfaces of the mixing and stirring elements even further supports the creation of a considerably non-stirred, outer ringshaped mass area which extends along the peripheral cylinder wall and follows the ends of the stirring arms during rotation. The outer non-stirred area is basically created due to the inclined position and uninterrupted extension of the radially outer mixing blades at the peripheral cylinder wall.

The upper and lower mixing blades constitute at their ends horizontal surfaces, which are situated axially in distance to the inside of the upper and lower horizontal wall surfaces of the mass chamber, respectively, for the creation of shear gaps intermediary the mentioned adjacent horizontal surfaces, through which gaps the mass is intended to pass during the rotation of the mixing and stirring elements. Though, because of the mass being dragged with the stirring element to a higher extent than being mixed with a movement relative to the stirring element as intended, the intended gaps of shear at the horizontal surfaces do not provide the shear effect as intended either.

By the provision of a mixing and stirring element according to the EP-patent the total surface area of the plate shaped arm and of the mixing blades, as well as of the surfaces of the mixing blades at the gaps of shear are kept constant along the radial extension of the arm. Thereby, no attention at all is paid to the fact, that parts of the arm at different radii progresses with totally different velocities, and the comparatively larger velocities at the gaps of shear at larger radii are supposed to support the unwanted and extensive frictional effect against the mass during its passage through the gaps.

The aim of the invention in question is therefore, to provide an apparatus for tempering comprising mixing and stirring elements, which provides an efficient shear effect in all of the zones of the mass chambers, as well as a uniform and gentle mixing and stirring of the mass in the mass chambers followed by an improved heat transportation in the mass.

SUMMARY OF THE INVENTION

According to the invention is provided, that an upper or lower mixing blade arranged at the peripheral end of the mixing and stirring element at its end has a vertically extending end surface, which is situated radially in distance of the inner surfaces on the peripheral cylindrical wall of the mass chamber, thereby providing a shear gap between the end surface and the cylinder wall, through which gap the mass flows when the mixing and stirring element rotates in the mass chamber. Hereby is achieved, that the effect of a shear gradient is provided by a gap at the comparatively large cylindrical surface area at the peripheral cylinder wall as well. A considerable increase of the total area of the shear gaps is obtained in comparison to that of the prior known temperers. At the same time improved mixing and stirring of the mass is achieved.

The end surface may conveniently constitute part of a cylindrical surface with essentially the same form as that of the cylindrical wall.

The end surface may further extend from the plate shaped arm and to the upper or lower limitation of the mass chamber, respectively, whereby the optimally achievable area of shear gradient is provided at the cylinder wall.

For the further increase of the stirring at the ring shaped area at the cylinder wall, the mentioned upper or lower mixing blade arranged on the peripheral end of the mixing and stirring element may comprise penetrations for the mass.

An expedient embodiment provides, that the end surface is arranged on an upper or lower essentially knob shaped part, respectively.

The invention further provides an apparatus by which, the upper and lower mixing blades at their ends comprise horizontal surfaces, which are situated axially in distance to the inside of the inner surfaces of the upper or lower horizontal wall of the mass chamber, respectively, thereby providing gaps between the respective opposite, horizontal end surfaces, through which gaps the mass flows during the rotation of the mixing and stirring element in the mass chamber, and in that the total surface area of the plate shaped arm and of the mixing blades decreases gradually in direction out towards the peripheral cylinder wall. Hereby is achieved a harmonious and balanced relation between the friction provided with the mass at a random radius of the arm and the velocity of the arm at the radius in question. The performance of the horizontal shear gaps is providing a far higher shear effect than by the prior temperers as the mass now flows through the gaps instead of being drapped in rotation with the stirring element. Testing has shown, that hereby is achieved a considerable more uniform stirring of the mass at all areas and zones of the chamber followed by an enhanced heat transport In the mass than was possible with the prior temperers.

Expedient embodiments provides, that the total surface area of the mixing blades decreases gradually in direction out towards the peripheral cylinder wall and/or that the total surface area of the horizontal area of the mixing blades in the gaps of performing shear gradient, decreases gradually in direction out towards the peripheral cylinder wall.

By a simple expedient embodiment, the leading and trailing edges of the plate shaped arm extend essentially straight from opposite sides of the drive shaft and outwards towards the peripheral cylinder wall.

By all the three basic embodiments according to the invention could also be provided, that the upper mixing blades are laid out and arranged in an opposite, laterally reversed manner at the upper side of the plate shaped arm to that of which the lower mixing blades are laid out and arranged at the lower side of the plated shaped arm, whereby the manufacture of the mixing and stirring elements are made simple and the stirring effect is especially expedient.

By yet another embodiment, a mixing and stirring element may comprise two, essentially similar mixing and stirring arms, which are positioned at an angle of 180° to each other, whereby the total frictional surface area is limited to only two arms achieving an enhanced movement of stirring through the mass without the mass being dragged by the mixing and stirring element.

The mixing blades could also be provided with a convex, curved extension in direction outwardly towards the peripheral cylinder wall, whereby the mass in excess of a radial shear force is influenced by a shear force in the direction of rotation.

The mixing blades may also extend from the leading edge and to the trailing edge of the plate shaped arm, respectively.

The gaps may be adapted to a shear gradient between 250 s-1 and 7000 s-1 during the flow of the mass through the gaps.

The mass chambers may also be interconnected by means of throughflow openings situated in the bottom of a chamber at the peripheral cylinder wall, or throughflow openings provided at the peripheral cylinder wall may be situated alternating and 180° positioned to each other, seen in the direction of the flow of the mass from chamber to chamber through the column.

Finally, the mass chambers may be interconnected via throughflow openings situated in the bottom of the mass chambers alternating at the peripheral cylinder wall and at the drive shaft, respectively, seen in the direction of the flow of the mass from chamber to chamber through the column.

BRIEF DESCRIPTION OF THE DRAWINGS

The invention will be explained below with reference to a particularly preferred embodiment as well as the drawing, in which FIG. 2 is a view from above of a mixing and stirring element, which is arranged in a mass chamber as depicted at FIG. 1.

FIG. 3 is a sectional view taken along the line 3—3 of the mixing and stirring element shown at FIG. 2, and FIG. 4 is a sectional view taken along the line 4—4 of an arm of the mixing and stirring element shown at FIG. 2, at an area close to the drive shaft.

DETAILED DESCRIPTION OF THE INVENTION

Figure 1:
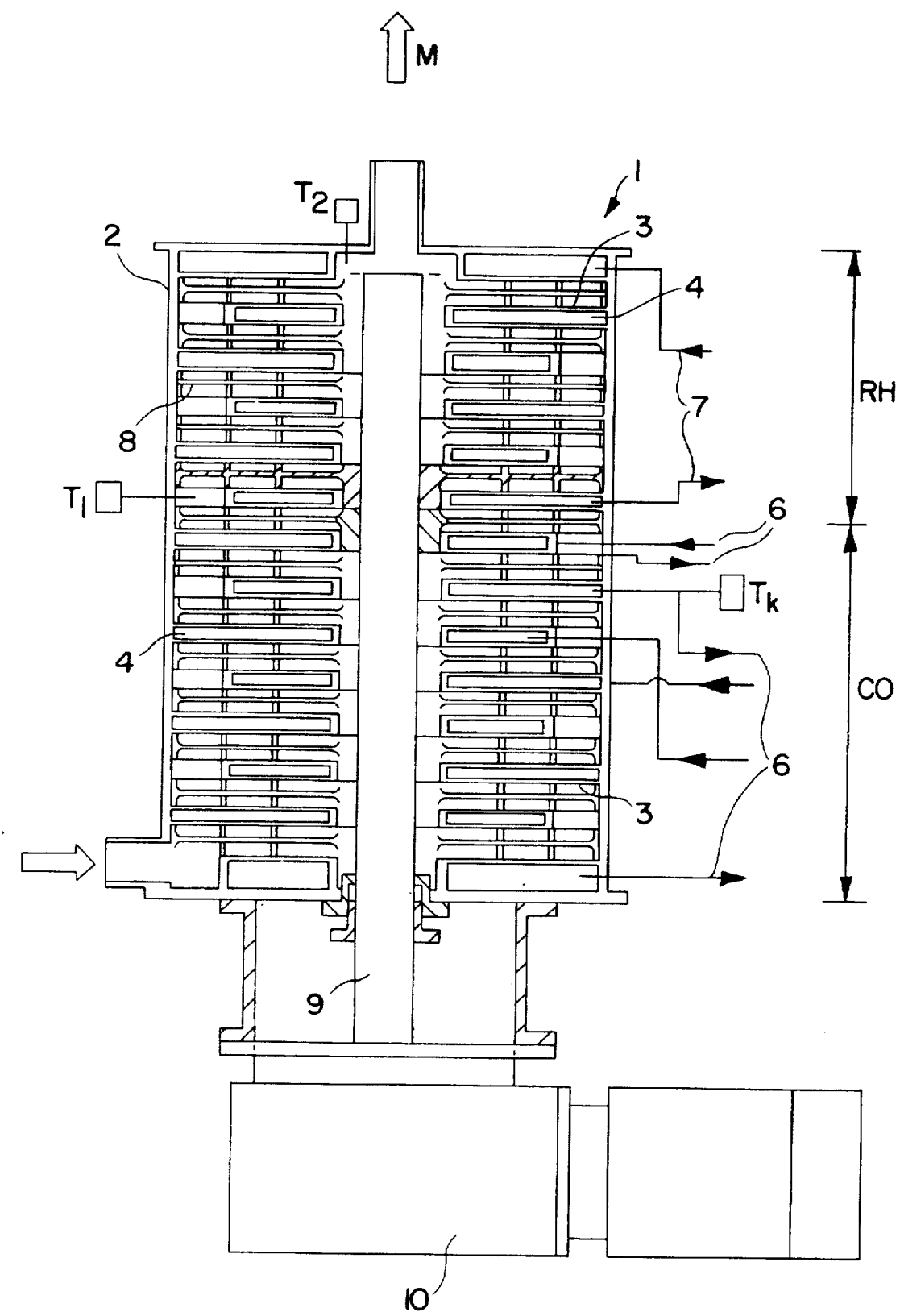
FIG. 1 is a view in vertical axial section of the tempering column of the apparatus according to the invention, by which the tube connections with the heat exchange chambers are shown in a schematic view as the circuits for the transportation of heat exchange media to and from the chambers.

The tempering apparatus 1 shown in FIG. 1 comprises a cylindrical tempering column 2 with a cooling stage CO and a subsequent reheating stage RH for the continuous tempering of a fat-containing, chocolate-like mass M pumped through the column 2.

The tempering column 2 further comprises a plurality of interconnected mass chambers 3, which are separated by intermediary heat exchange chambers 4 adapted to absorb heat from the mass chambers 3 or to submit heat to the mass chambers 3 during flow of cooling media through the heat exchange chambers of the cooling stage CO or during flow of heating media through the heat exchange chambers of the reheating stage RH during the flow of the mass M through the chambers and up through the column 2.

The cooling media is conveyed to the heat exchange chambers of the cooling stage CO via schematically shown tube connections 6, and the heating media is conveyed to the heat exchange chambers of the reheating stage RH via schematically shown tube connections 7.

Circuits adapted for control of temperature and flow of circulation of the heat exchange media to and from the chambers 4 are not shown and may be laid out and arranged in many ways as long as the above described tempering takes place.

A part of the cooling circuit will normally comprise control means, which secures the provision of a plurality of heat exchange chambers 4 having a constant temperature Tk of the cooling media, thereby creating a pre-crystallisation zone at the adjacent mass chambers. The heat exchange media is circulated continuously through the heat exchange chambers 4.

The mass temperature T1 is measured when the mass leaves the cooling stage, and is measured again at T2 when it leaves the reheating stage.

The mass chambers 3 further comprise mixing and stirring elements 8, as shown in FIG. 2 and 3, and which are rotated by a common drive shaft 9, which is arranged centrally in the column 2 and is powered by a motor 10. By the disclosed embodiment the mixing and stirring elements 8 each comprise two identical, plate shaped arms 11, which extends radially from a hub 12 and are positioned 180° from each other in relation to the axis. The number of plate shaped arms each stirring element could be 3 or 4 or more as well.

The arms 11 are provided with upper and lower, axially extending mixing blades 13, 14, 15, 16; 17, 18, 19 20, which are plate shaped. The upper mixing blades 13, 14, 15, 16 extend radially outward in the opposite direction to the extension of the lower mixing blades 17, 18, 19, 20, with respect to the direction of rotation O of the mixing and stirring elements 8 or in the opposite direction, respectively.

The upper mixing blades 13, 14, 15, 16 are laid out and arranged on the plate shaped arms 11 upper side in an opposite, laterally reversed manner, in relation to that of which the lower mixing blades 17, 18, 19, 20 are laid out and arranged on the lower side of the plate shaped arm 11.

The mixing blades 13, 14, 15, 16; 17, 18,19, 20 have a convex, curved shape in a direction extending radially outwardly towards the peripheral cylinder wall 28 of the cylindrical column 2, whereby the mass in excess of a radial shear force is influenced by a shear force in the direction of rotation O during mixing as well.

The mixing blades 13, 14,15, 16; 17, 18, 19, 20 extend from the leading edge 21 of the plate shaped arm 11 and to the trailing edge 22.

Referring to FIG. 3, the mass chambers 3 are interconnected by means of openings 23 for the flow of mass therethrough, which openings 23 are arranged in the bottom of a chamber 3 close by the peripheral cylinder wall 28, and are arranged alternating and positioned 180° to each other from chamber 3 to chamber 3, seen in the direction of the flow of the mass through the column 2, which direction in the describe embodiment is upwards. The openings 23 for the flow of mass therethrough could as well be arranged at other areas of the bottom of the chamber 3, close by the hub or at the hub itself.

An upper or lower mixing blade 13, 17 near the hub 12 of a mixing and stirring element 8 extends radially and uninterrupted from the hub 12 and forwards in the direction of rotation O of the mixing and stirring element 8, and an opening 24 for the flow of chocolate mass therethrough is provided in the plate shaped arm 11 of the mixing and stirring element 8 at a part 5 of the arm located between the mentioned inner mixing blade 13, 17 and the hub 12 itself, as depicted in FIGS. 2–4. Hereby is provided an axial flow of the mass close to the drive shaft 9 and the hub 12, so that nests and zones of no stirring in the mass are avoided around the shaft 9, especially where the plate shaped arm 11 is connected with the hub 12.

When the mixing and stirring element 8 rotates clockwise in the direction of rotation O, the mass is forced by the acting pressure of the lower mixing blades 17 up through the openings 24 and further horizontally and slightly radially along the length of the upper mixing blades 13 and out into the remaining mass.

An especially expedient mixing and stirring in the zone of the mass close by the hub 12 is achieved when the opening 24 extends essentially close to the mixing blade as well as to the hub 12 at the mentioned part 5 of the arm located between the hub 12 and its connection with the uninterrupted extension of the mixing blade.

When the edge parts 26 of the opening 24, which parts during the rotation of the mixing and stirring element in the mass are the leading parts, are chamfered in the flow direction of the mass into the opening 24, or when the edge parts 25 of the opening 24, which parts during the rotation of the mixing and stirring element 8 in the mass are the trailing parts, are chamfered in the flow direction of the mass out of the opening 24, an especially forceful axial flow through the opening 24 is achieved.

Edge parts of the opening may expediency be curved, and some of the peripheral parts 29 of the opening, could in their vertical largest extension take the form of part of a circle with its centre at the axis of rotation of the drive shaft 8. The largest extension of the opening 24 could be in the direction of rotation O of the stirring element 8, i.e. FIG. 2, for the provision of an uninterrupted flow through the opening.

The upper and lower mixing blades 13, 14, 15, 16; 17, 18, 19, 20, have at their ends horizontal surfaces 30, which are spaced axially from the upper and lower horizontal wall surfaces 31, 32 respectively of the mass chamber, for the creation of gaps of a shear gradient intermediate the mentioned adjacent horizontal surfaces, through which gaps the mass passes during the rotation of the mixing and stirring elements as essentially is known.

For the sake of good order it should be mentioned, that the shear gradient or often called the shear quotient is defined as the quotient of the difference in speed between the surfaces that demarcate the gap and the width of the gap.

The quotient of shear is by experience between 250 s-1 and 7000 s-1.

The disclosed embodiment provides, that an upper or lower mixing blade 16; 20 arranged at the peripheral end of the mixing and stirring element has at its end a vertically extending end surface 27, which is spaced radially in distance of the inner surface of the peripheral cylindrical wall 28 of the mass chamber, as shown in FIG. 3, thereby providing a gap performing a shearing gradient between the end surface 27 and the cylinder wall 28, through which gap the mass flows when the mixing and stirring element 8 rotates in the mass chamber 3. Hereby is achieved, the effect of a shear gradient by a gap at the comparatively large cylindrical surface area at the peripheral cylinder wall 28 as well. A considerable increase of the total area of the gaps providing the shear gradient effect is obtained in comparison to that of the prior known temperers. At the same time improved mixing and stirring of the mass is achieved.

By the disclosed embodiment, the end surface 27 constitutes part of a cylindrical surface with essentially the same form as that of the cylindrical wall 28.

The end surface 27 may further extend from the plate shaped arm 11 to the upper or lower limitation of the mass chamber 3, respectively, whereby an optimally achievable area of shear gradient is provided at the cylinder wall 28.

For the further increase of the stirring at the ring shaped area at the cylinder wall, the mentioned upper or lower mixing blade 16; 20 arranged on the peripheral end of the mixing and stirring element 8 may have openings for the mass, and the end surface 27 may be arranged on an upper or lower essentially knob shaped part, 16', 20' respectively.

By the disclosed embodiment the total surface area of the plate shaped arm 11 and of the mixing blades 13,14, 15, 16; 17, 18, 19, 20 decreases gradually in direction out towards the peripheral cylinder wall 28. Thus is achieved a harmonious and balanced relation between the friction provided with the mass at a random radius of the arm 11 and the velocity of the arm at the radius in question. Testing has shown, that this achieves a considerable more uniform stirring of the mass at all areas and zones of the chamber followed by an enhanced heat transport in the mass than was possible with the prior temperers. At the same time prior known tendency of the mass being dragged around in the chamber by the stirring element instead of moving relatively to that is eliminated.

Especially expedient embodiments provide, that the total surface area of the mixing blades 13, 14, 15, 16; 17, 18, 19, 20 decreases gradually in direction out towards the peripheral cylinder wall 28 and or that the total surface area of the horizontal area of the mixing blades in the gaps performing a shear gradient, decreases gradually in direction out towards the peripheral cylinder wall 28. The friction between the mass and the adjacent surfaces of the gaps of shear are thereby adjusted in a most convenient manner to the velocity at a random radius of the arm 11, whereby an enhanced stirring follows.

Finally it should be mentioned, that by the disclosed embodiment of the mixing and stirring element, the direction of rotation may be the opposite, i.e. anti-clockwise as well, the above described advantages being maintained as well. The only difference concerning the function will be, that the mass will flow in the direction from above and down through the of from below and up through the openings 24 when the stirring elements rotate clockwise as depicted in FIG. 2.

I claim:

1. An apparatus for the continuous tempering of a fat-containing, chocolate mass comprising a cylindrical tempering column having a cooling stage and a subsequent reheating stage through which the mass flows, each stage containing a plurality of mass chambers interconnected for the flow of the mass separated by intermediary heat exchange chambers, said heat exchange chambers being adapted to absorb heat from the mass chambers during flow of cooling media through the heat exchange chambers in the cooling stage and to submit heat to the mass chambers during flow of heating media through the heat exchange chambers in the reheating stage, a drive shaft arranged for rotation about an axis located centrally of the column, a mixing and stirring element located in each mass chamber and adapted to be rotated by said drive shaft, each of said mixing and stirring elements having at least one radially extending plate shaped arm and a plurality of upper and lower plate shaped mixing blades extending in an essentially axial direction from an upper and lower side of said arm, respectively, said upper mixing blades extending radially outward in a direction opposite to an outward radial extension of said lower mixing blades with respect to the direction of rotation of the mixing and stirring element, wherein an end mixing blade extending axially from at least one of said upper and lower sides of said arm at a peripheral end thereof, has an axially extending end surface spaced radially from an inner cylindrical wall surface of the cylindrical column to provide a shear gap between said surfaces through which gap the mass flows when the mixing and stirring elements are rotated in the mass chambers.

2. The apparatus of claim 1, wherein the axially extending end surface of the end mixing blade has a cylindrical surface with essentially the same form as that of the cylindrical wall surface of the cylindrical column.

3. The apparatus of claim 1, wherein the axially extending end surface of the end mixing blade extends form the peripheral end of the plate shaped arm to an upper or lower surface of the mass chamber within which the mixing and stirring element rotates.

4. The apparatus of claim 1, wherein the end mixing blade at the peripheral end of the arm of the mixing and stirring element has openings for the flow of mass therethrough.

5. The apparatus of claim 4, wherein the axially extending end surface is arranged on a knob shaped part.

6. The apparatus of claim 1, including an end mixing blade having said axially extending end surface extending axially from both said upper and lower sides of said arm at the peripheral end thereof.

7. An apparatus for the continuous tempering of a fat-containing, chocolate mass comprising, a cylindrical tempering column having a cooling stage and a subsequent reheating stage through which the mass flows, each stage containing a plurality of mass chambers interconnected for the flow of the mass separated by intermediary heat exchange chambers, said heat exchange chambers being adapted to absorb heat from the mass chambers during flow of cooling media through the heat exchange chambers in the cooling stage and to submit heat to the mass chambers during flow of heating media through the heat exchange chambers in the reheating stage, a drive shaft arranged for rotation about an axis located centrally of the column, a mixing and stirring element located in each mass chamber and adapted to be rotated by said drive shaft, each of said mixing and stirring elements having at least one radially extending plate shaped arm and a plurality of upper and lower plate shaped mixing blades extending in an essentially axial direction from one upper and lower side of said arm, respectively, said upper mixing blades extending radially outward in a direction opposite to an outward radial extension of said lower mixing blades with respect to the direction of rotation of the mixing and stirring element, wherein said upper and lower mixing blades have, at an end remote from said plate shaped arm, horizontal surfaces which are spaced axially from inner wall surfaces of upper and lower horizontal walls, respectively, of the mass chambers to provide shear gaps between said surfaces though which gaps the mass flows when the mixing and stirring elements are rotated in the mass chambers and wherein the total surface area of the plate shaped arm and of the mixing blades decreases gradually in a direction radially outward toward a peripheral end of the arm.

8. The apparatus of claim 7, wherein the total surface area of the mixing blades decreases gradually in a direction out towards the peripheral end of the arm.

9. The apparatus of claim 7, wherein the total surface area of the horizontal surface of the mixing blades decreases gradually in a direction out towards the peripheral end of the arm.

10. The apparatus of claim 7, wherein leading and trailing edges of the plate shaped arm extend essentially straight from opposite sides of the drive shaft out towards the peripheral end of the arm.

11. The apparatus of claim 1 or 7, wherein the upper mixing blades are laid out and arranged in an opposite, laterally reversed manner on the upper side of the plate shaped arm to that of which the lower mixing blades are laid out and arranged on the lower side of the plate shaped arm.

12. The apparatus of claim 1 or 7, wherein a mixing and stirring element comprises two, essentially similar plate shaped arms, which are positioned at an angle of 180° to each other.

13. The apparatus of claim 1 or 7, wherein the mixing blades have a convex, curved shaped extending in a direction out towards the peripheral end of the arm.

14. The apparatus of claim 1 or 7, wherein the mixing blades extend from the leading edge to the trailing edge of the plate shaped arm.

15. The apparatus of claim 1 or 7, wherein the gaps are adjusted to a shear gradient of between 250 s-1 and 7000 s-1 during the flow of the mass through the gaps.

16. The apparatus of claim 1 or 7, wherein the mass chambers are interconnected by flowthrough openings located in a bottom of each mass chamber adjacent an inner wall surface of the cylindrical column.

17. The apparatus of claim 16, wherein the flowthrough openings of adjacent mass chambers are situated alternating and positioned 180° to each other with respect to the direction of flow of the mass from mass chamber to mass chamber through the cylindrical column.

* * * * *